Dec. 18, 1923.
R. J. MEYERS
1,477,710
MEANS AND METHOD FOR OPERATING COMBUSTION ENGINES FROM GAS
DERIVED FROM CALCIUM CARBIDE
Filed Feb. 3, 1923
2 Sheets-Sheet 1

INVENTOR
Roy J. Meyers
BY
R. S. Berry
ATTORNEY

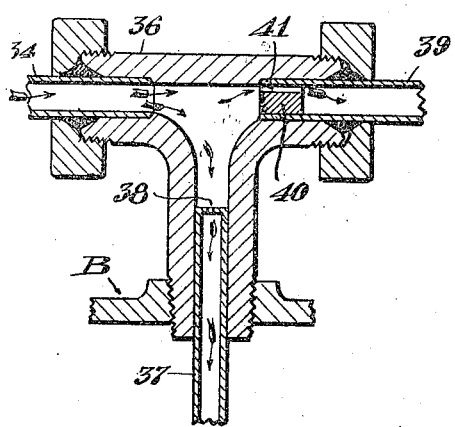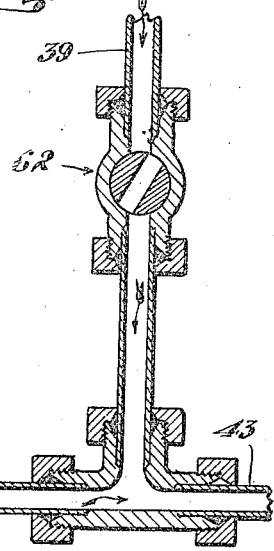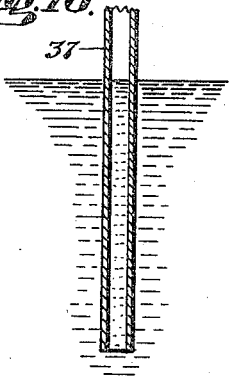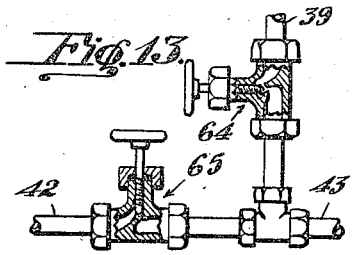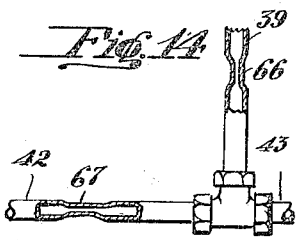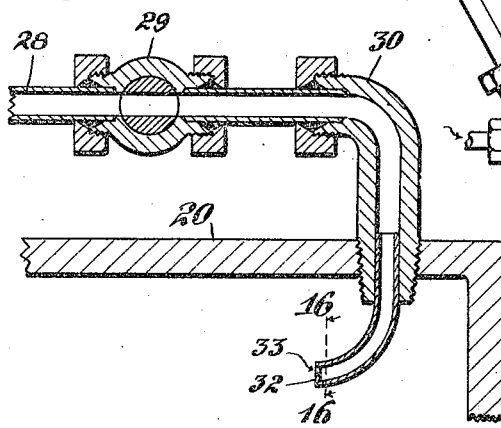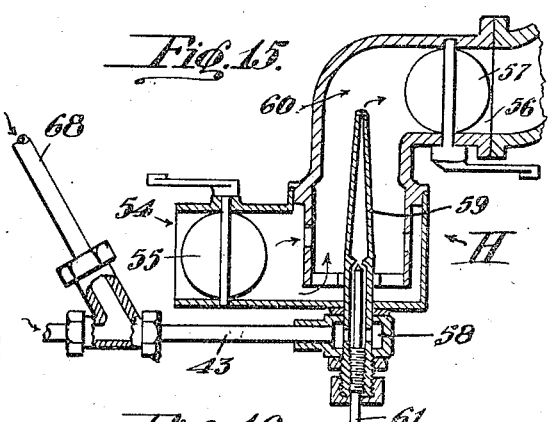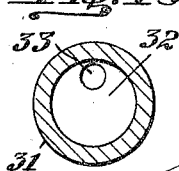

Patented Dec. 18, 1923.

1,477,710

UNITED STATES PATENT OFFICE.

ROY J. MEYERS, OF LONG BEACH, CALIFORNIA, ASSIGNOR TO INTERNATIONAL GAS, POWER AND APPLIANCE COMPANY, OF LONG BEACH, CALIFORNIA, A CORPORATION OF ARIZONA.

MEANS AND METHOD FOR OPERATING COMBUSTION ENGINES FROM GAS DERIVED FROM CALCIUM CARBIDE.

Application filed February 3, 1923. Serial No. 616,633.

*To all whom it may concern:*

Be it known that I, ROY J. MEYERS, citizen of the United States, residing at Long Beach, in the county of Los Angeles and State of California, have invented certain new and useful Improvements in Means and Methods for Operating Combustion Engines from Gas Derived from Calcium Carbide, of which the following is a specification.

My invention relates to the operation of internal combustion engines and is a continuation in part of application Serial Number 541,370, filed March 6, 1922.

An object of my invention is to provide a means and method whereby calcium carbide may be employed as a source of fuel for operating internal combustion engines to perform work, and whereby such engines may be operated more economically than can now be effected with liquid hydrocarbons.

Other objects are: to provide a means whereby gas may be generated from calcium carbide and fed to the intake of an engine in volume substantially as used to operate an engine with the gas maintained at low pressure.

To provide an apparatus of the above character which is applicable to internal combustion engines now generally in use, without necessitating change of their structure.

With the foregoing objects in view, together with such other objects and advantages as may subsequently appear, my invention resides in the parts and in the construction, combination and arrangement of parts and in the method hereinafter described and claimed and illustrated by way of example in the accompanying drawings, in which—

Figure 1 is a diagram of the invention as applied, showing parts in section and elevation and illustrating the mode of operation.

Figures 2, 3 and 4 are views in section of the valves shown in the circles indicated at 2, 3 and 4 in Figure 1.

Figure 5 is a section as seen on the line 5—5 of Figure 1.

Figure 6 is a section as seen on the line 6—6 of Figure 1.

Figure 7 is a horizontal section on the line 7—7 of Figure 1.

Figure 8 is a section on line 8—8 of Figure 7.

Figures 9, 10, 11 and 12 are sections of the parts shown in the circles indicated at 9, 10, 11 and 12 in Figure 1.

Figures 13 and 14 are details illustrating modified forms of the structure shown in Figure 12.

Figure 15 is a view in section showing a modified form of the gas and air mixer.

Figure 16 is an enlarged detail in section as seen on the line 16—16 of Figure 11.

More specifically, A indicates a generator embodying a cylinder 20 having closure 21 fastened to the cylinder by screws 22. A pan 23 for containing calcium carbide is arranged in the generator.

B indicates a combined water tank and gas storage reservoir divided into two chambers C and D by a partition 24, and provided with a by-pass 25 connecting the chambers fitted with a cut-off valve 26. The upper portion of the chambers C and D communicate through a by-pass 27.

Leading from the chamber C is a water feed pipe 28 fitted with a valve 29 and connecting with a pipe 30 passing into the generator. A nozzle 31 on pipe 30 within the generator has an end wall 32 formed with a restricted opening 33 through which water is fed to calcium carbide in pan 23.

Leading from the generator is a gas conduit 34 fitted with a cut-off valve 35 and connecting with a T-coupling 36 leading into the chamber D. A tube 37 extends downwardly from T-coupling 36 and opens below the surface of the water in the reservoir. A needle opening 38 is formed in the upper end of tube 37. Leading from coupling 36 and opening to conduit 34 and tube 37 is a pipe 30 having at its end a baffle 40 provided with a needle opening 41 adjacent the upper portion of pipe 39. Extending from the upper portion of chamber D is a duct 42 which is joined to pipe 39 and leading from the juncture of duct 42 and pipe 39 is a gas feed pipe 43 fitted with a cut-off valve 44. Pipe 43 opens to a chamber 45 in an air and gas mixer F which may comprise an ordinary carburetor, as shown in Figure 1, and which is fitted with a normally open needle valve 46, an air inlet 47, and an outlet 48; the latter connecting with the intake manifold 49 of an internal combustion engine G provided with the usual pistons 50 connecting with a crank shaft 51. Butterfly valves 52 and 53 are provided to control the inlet and outlet 47 and 48, respectively.

If desired, a mixer H, such as shown in Fig. 15, may be employed in lieu of the carburetor F, which mixer embodies an air inlet 54 fitted with a control valve 55, and an outlet 56 fitted with a valve 57; the gas feed pipe 43 connecting with a chamber 58 communicating with a nozzle 59 leading upwardly into a chamber 60 within the mixer, and having a normally open needle valve 61 for controlling the discharge from the nozzle.

Pipe 39 and duct 42 are provided with suitable resistance members which may constitute cut-off valves 62 and 63, as shown in Figures 1 and 12, or may comprise needle valves 64 and 65 as shown in Figure 13, or may consist of restricted passages 66 and 67 as shown in Figure 14. It is to be noted that the submerged end of tube 37, the needle orifice 41 in pipe 39, and the needle valve in the mixer each constitute resistance means which with the resistance members in pipe 39 and duct 42 serve to retard flow of gas to the engine.

Means are provided for delivering water vapors to the gas and air mixture delivered to the intake manifold, here shown as comprising a pipe 68 leading from the water reservoir in a radiator 69 and passing through the engine exhaust manifold 70. Pipes 68 is fitted with a needle valve 71, and may lead to the air intake 47 of the carbureter, as shown in Figure 1, where an ordinary carbureter is used, or it may connect with the gas feed pipe 43 as shown in Figure 15.

The generator A and tank B may be fitted with pressure gauges 72 and 73, and with safety valves 74 and 75.

The generator A is provided with an exhaust pipe 76 fitted with a normally closed valve 77.

It is desirable to interpose a gradually restricted throat 78 between the mixer and the intake manifold, as particularly shown in Figures 7 and 8, which serves to effect a more intimate mixture of the air, gas and water vapors entering the intake manifold.

On initial operation, valves 29, 35, 62, 63, 71 and 77 are closed and needle valve 46 or 61 and cut-off valve 44 are open.

A charge of calcium carbide is then placed in the generator, and the latter tightly closed. Valve 29 is opened to permit water to feed from chamber C to the calcium carbide through the restricted orifice 33, thereby generating gas, a portion of which, on opening valve 35, passes to reservoir B through conduit 34 and tube 37, the gas being scrubbed as it passes through water in chamber D. Initial gas generation is rapid but presently becomes slower when the pressures in the generator and reservoir nearly correspond; gauges 72 and 73 then indicating that the pressure in the generator is slightly above that in the reservoir, the difference in pressure evidently will be proportional to the distance below the surface of the water that tube 37 extends. Valve 35 is then closed to close communication between the generator and the reservoir, and exhaust valve 77 is momentarily opened to reduce pressure in the generator, whereupon an increased feed of water to the generator is effected by reason of the relatively increased pressure in the reservoir. Exhaust valve 77 is then closed. When the pressure in the generator exceeds that in the reservoir, valve 35 is again opened to deliver more gas to the reservoir. These operations are repeated if necessary, to build up pressure in the reservoir to approximately four pounds. It is found in practice that the pressure in the generator will exceed that in the reservoir approximately three-tenths of a pound, and that with a pressure of four pounds in the reservoir and four and three-tenths pounds in the generator, highly satisfactory running conditions are attained. In the course of building up the pressure in the reservoir B, valve 63 is opened to vent air from the reservoir through the pipe 43; valve 63 being closed when the presence of gas at the mixer is detected.

After the pressures have been built up in the reservoir and generator, continued generation of the gas becomes so slow that considerable time will elapse before there is a perceptible increase of pressures indicated on the gauges.

Valves 62 and 63 are then opened and are carefully adjusted relative to each other to effect a slow feed of raw gas through pipe 39 and of scrubbed gas through duct 42 to the feed pipe 43, from which the mixed gases pass to the chamber 46 or 58, whereupon the engine is started in the usual manner so that the engine pistons on their intake strokes will induce a suction and thereby draw a mixture of gas and air into the engine cylinder which on being compressed and ignited in the usual manner will explode and effect operation of the engine.

On initial starting of the engine, needle valve 71 is opened to continuously admit water vapors to the air and gas mixture.

By providing the perforated baffle 40, solids carried by the gas and vapors entering the T-coupling will be caused to pass through the tube 37 and be collected in the water in chamber D; and practically clear raw gas will flow through the perforation 41 to the engine.

By providing the needle opening 38, tendency of water to siphon through the tube 37 will be obviated.

It has been found in practice that when the resistance valves 62 and 63 are properly adjusted relative to each other, a substantially constant relative pressure of gas will be maintained in the generator and reservoir with the pressure in the reservoir slightly less than in the generator, and that a practically uniform relative feed of gas from the reservoir and generator to the engine will be effected, irrespective of variations of speed of the engine; that is to say, acceleration of speed of the engine accelerates generation of gas, and retarding the engine correspondingly retards generation of the gas without noticeable change of pressure in the reservoir and generator. It follows that as operation of the throttle valve 53 in the usual manner controls the speed of the engine, the operation of the throttle also controls the operation of the generator.

It will be noted that as there is an open communication between the intake manifold of the engine and the gas feed pipe 43, suction induced by the engine will act to vary the effect of the resistances in pipe 39 and duct 42 which, although the pressures in the reservoir and generator afforded by the resistances tend to effect gas discharge through the gas feed pipe, the suction induced by the engine will augment or accelerate the gas feed correspondingly from the reservoir and generator.

By providing the needle orifice 33 in the water feed nozzle 31, an extremely slow delivery of water to the carbide is normally effected, but it has been found that on increasing the rate of discharge of gas from the generator, as by operation of the engine, the volume of water fed to the generator will be correspondingly increased so as to maintain a practically uniform ratio of water feed proportional to the gas consumption.

It has been found in practice that a comparatively small volume of the gas is required to effect operation of the engine, and by means of the apparatus here shown applied to the internal combustion engine in a motor vehicle of the Ford type, the vehicle can be propelled under ordinary road conditions for a distance of from forty to fifty miles on a charge of approximately one pound of calcium carbide.

While I have shown and described a specific embodiment of my invention, I do not limit myself to the exact construction shown, but may employ such changes and modifications in the construction and arrangement of parts as come within the scope of the appended claims.

I claim:

1. The method of operating combustion engines from gas derived from calcium carbide, consisting in placing gas in a reservoir, generating gas from calcium carbide in a generator, delivering gas through one pipe line from the generator and through another pipe line from the reservoir, then uniting the gas stream lines and delivering the united lines to an engine, compressing and exploding the gas in the engine to operate the latter, delivering gas from the generator to the reservoir to replace the gas discharged from the reservoir and thereby maintain substantially a constant pressure in the reservoir, and feeding water to calcium carbide in the generator in such quantity as to generate gas in a volume substantially corresponding to the volume used by the engine.

2. The method of operating a combustion engine from gas derived from calcium carbide, consisting in passing water from a water reservoir to the carbide in a generator, delivering gas from the generator to the reservoir, delivering by separate pipe lines from said reservoir and generator to an engine, gas derived from calcium carbide, intermixing it with air at the engine, compressing and exploding the mixture and generating the gas substantially as used, by feeding water to the calcium carbide.

3. The method of operating a combustion engine from gas derived from calcium carbide, consisting in delivering gas from the generator to the reservoir, delivering by separate pipe lines from said reservoir and generator to the engine, a gas derived from calcium carbide, intermixing it with air and water vapors at the engine, compressing and exploding the mixture and generating the gas substantially as used, by feeding water to the calcium carbide.

4. The method of operating a combustion engine from the gas derived from calcium carbide, consisting in delivering scrubbed gas from the generator to the reservoir, delivering by separate pipe lines from said reservoir and generator to an engine, a mixture of raw gas from the generator and scrubbed gas from the reservoir, both derived from the calcium carbide intermixing it with air at the engine, compressing and exploding the mixture and generating the gas substantially as used.

5. The method of operating a combustion engine from gas derived from calcium carbide consisting in delivering scrubbed gas from the generator to the reservoir, delivering by separate pipe lines from said reservoir and generator to an engine, a mixture of raw gas from the generator and scrubbed gas from the reservoir derived from the calcium carbide, intermixing it with air and water vapors at the engine, compressing and exploding the mixture and generating the gas substantially as used.

6. The method of generating acetylene from water and calcium carbide and supplying it to an engine which consists in passing the water from a water reservoir into a generator holding the carbide, then passing part of the resulting acetylene from the generator through the water reservoir to the engine and the other part directly from the generator to the engine.

7. The method of operating combustion engines from gas derived from calcium carbide, consisting in producing gas from calcium carbide under pressure in a generator, placing the gas with water under pressure in a reservoir, delivering gas through one pipe line from the generator and through a separate pipe line from the reservoir to an engine intermixed with air, replacing gas discharged from the reservoir with gas from the generator, and maintaining continued generation of the gas in the generator as used by feeding water from the reservoir to calcium carbide in the generator.

8. The method of operating combustion engines from gas derived from calcium carbide, consisting in producing gas from calcium carbide under pressure in a generator, placing the gas with water under pressure in a reservoir, delivering gas through one pipe line from the generator and through a separate pipe line from the reservoir to an engine intermixed with air and water vapors, replacing gas discharged from the reservoir with gas from the generator, and maintaining continued generation of gas in the generator as used by feeding water from the reservoir to calcium carbide in the generator.

9. The process of generating acetylene gas to operate an internal combustion engine, comprising supplying from a reservoir to a tank of carbide, the water to generate the acetylene, conducting part of the resulting acetylene gas from said tank to a point below the surface of the water in the water reservoir and thence from the water reservoir to the engine and part of the acetylene directly from the generator to the engine without passage through the water reservoir.

10. The process of generating acetylene to feed an internal combustion engine which consists in passing water from a water reservoir into a tank of carbide, conducting from the tank the acetylene and passing part of it through a pipe extending below the surface of the water in the water reservoir and the other part directly from the tank to the engine, conducting from the water reservoir the acetylene gas delivered thereto through the water, thus causing a differential pressure between the water reservoir and the carbide generator to control the flow of water from said reservoir into the generator.

11. Means for generating acetylene to operate an engine, comprising a water reservoir, a carbide tank, a water passage between the tank and reservoir, a connection from the carbide tank having one branch extending into the water reservoir and another branch extending to the combustion engine, and a third branch connection extending from the water reservoir also to the engine.

12. Means for generating acetylene gas and supplying it to an internal combustion engine, comprising a water reservoir, a carbide tank, a connection between the two, a pipe extending from the carbide tank and having two branches, one branch extending to the engine and the other branch extending below the surface of the water in the water reservoir, there being a third branch extending from the interior of the water reservoir to join with the branch extending to the engine.

13. Means for operating combustion engines with gas derived from calcium carbide, comprising a gas generator, a gas and water reservoir, means for feeding water from the reservoir to the generator, and means for delivering and controlling the rate of flow of gas from the generator to the reservoir, and branch pipe lines connected respectively to the generator and reservoir for delivering gas coincidently from the generator and reservoir to an engine.

14. Means for operating combustion engines with gas derived from calcium carbide, comprising a gas generator, a gas and water reservoir, means for feeding water from the reservoir to the generator, means for delivering and controlling the rate of flow of gas from the generator to the reservoir, branch pipe lines connected respectively to the generator and reservoir for delivering gas coincidently from the generator and reservoir to an engine, and means for controlling the rate of flow of gas from the generator to the engine.

15. Means for operating combustion engines with gas derived from calcium carbide, comprising a gas generator, a gas and water reservoir, means for feeding water from the reservoir to the generator, means for delivering and controlling the rate of flow of gas from the generator to the reservoir, branch pipe lines connected respectively to the generator and reservoir for delivering gas coincidently from the generator and reservoir to an engine, and means for controlling the rate of flow of gas from the reservoir to the engine.

16. Means for operating combustion engines with gas derived from calcium carbide, comprising a gas generator, a gas and water reservoir, means for feeding water from the reservoir to the generator, means for delivering gas from the generator to the reservoir under resistance, whereby pressure in the generator will be caused to exceed pressure in the reservoir, means for delivering gas coincidently from the generator and reservoir to an engine, means for resisting the flow of gas from the generator to the engine, and means for resisting the flow of gas from the reservoir to the engine.

17. Means for operating combustion engines with gas derived from calcium carbide, comprising a gas generator, a gas and water reservoir, means for feeding water from the reservoir to the generator, means for delivering gas from the generator to a point beneath the top level of the water in the reservoir, branch pipe lines connected respectively to the generator and reservoir for delivering a mixture of gas from the generator and reservoir to the engine, the suction of the engine augmenting the delivery of gas from the generator and reservoir.

18. Means for operating combustion engines with gas derived from calcium carbide, comprising a gas generator, a gas reservoir, means for delivering water to the generator, an air and gas mixer, means for delivering a mixture of gas from the generator and the reservoir to said mixer, means for inducing a suction in said mixer, means for delivering gas from the generator to the reservoir under resistance whereby the pressure in the reservoir will be less than that in the generator, and means for resisting the flow of gas to said mixer.

19. Means for operating combustion engines with gas derived from calcium carbide, comprising a gas reservoir containing water, a gas generator, means for feeding water to said generator, a gas conductor leading from said generator and opening in the water in the reservoir, a gas and air mixer, a gas conductor leading to said mixer and communicating directly with the generator, a gas conductor leading from said gas reservoir to said mixer, and suction means for delivering gas and air from said mixer acting on said gas conductors.

20. Means for operating combustion engines with gas derived from calcium carbide, comprising a gas reservoir containing water, a gas generator for containing calcium carbide, a gas conduit leading from said generator, means for delivering water to said generator, a tube connecting with said conduit and opening in the water in the reservoir, an air and gas mixer, a pipe leading from the intersection of said tube and conduit and communicating with said mixer, and a duct leading from said reservoir and communicating with said mixer.

21. Means for operating combustion engines with gas derived from calcium carbide, comprising a gas reservoir containing water, a gas generator for containing calcium carbide, means for delivering water to said generator, a gas conduit leading from said generator, a tube connecting with said conduit and opening in the water in the reservoir, said tube opening to said conduit through a needle orifice, an air and gas mixer, a pipe leading from the intersection of said tube and conduit and communicating with said mixer, and a duct leading from said reservoir and communicating with said mixer.

22. Means for operating combustion engines with gas derived from calcium carbide, comprising a gas reservoir containing water, a gas generator for containing calcium carbide, means for delivering water to said generator, a gas conduit leading from said generator, a tube connecting with said conduit and opening in the water in said reservoir, an air and gas mixer, a pipe leading from the intersection of said tube and conduit and communicating with said mixer, a perforated baffle in said pipe, and a duct leading from said reservoir and communicating with said mixer.

23. Means for operating combustion engines with gas derived from calcium carbide, comprising a gas reservoir containing water, a gas generator for containing calcium carbide, means for delivering water to said generator, a gas conduit leading from said generator, a tube connecting with said conduit and opening to the water in the reservoir, said tube opening to said conduit through a needle orifice, an air and gas mixer, a pipe leading from the intersection of said tube and conduit communicating with said mixer, a perforated baffle in said pipe, and a duct leading from said reservoir and communicating with said mixer.

24. Means for operating combustion engines with gas derived from calcium carbide comprising gas generating means, gas storage means, a normally open connection between the generating and storing means, branch pipes leading respectively from the gas generating means and from the storage means to the engine, and means for delivering steam from the engine radiator to the engine.

25. Means for generating acetylene to operate an engine comprising a water reservoir, a carbide tank, a water passage between the tank and reservoir, and means to maintain a differential pressure in the carbide tank and water reservoir, both the carbide tank and reservoir being normally in open direct connection with the engine during the suction period of the engine.

26. Means for operating combustion engines with gas derived from calcium carbide, comprising suction means, gas generating means, a water reservoir with a restricted opening between the generator and reservoir, means for delivering gas below the surface of the water in the reservoir from the generating means whereby the gas is scrubbed and means for delivering raw gas from the generating means together with the scrubbed gas from the reservior to said suction means.

27. Means for operating combustion engines with gas derived from calcium carbide, comprising suction means, gas generating means, gas storage means, means for delivering scrubbed gas from the generating means to the storage means, means for delivering raw gas from the generating means together with scrubbed gas from the storage means to said suction means, and means for effecting variable action of the generating means relative to variable action of the suction means.

28. Means for generating acetylene to operate an engine comprising a water reservoir, a carbide tank divided by partitions into compartments, a water passage between the tank and reservoir, and means to maintain a differential pressure in the carbide tank and water reservoir both the carbide tank and reservoir being normally in open direct connection with the engine during the suction period of the engine.

29. Means for generating acetylene to operate an engine comprising a water reservoir, a carbide tank, a water passage between the tank and reservoir, a steam passage between the engine radiator and the intake of the engine, and means to maintain a differential pressure in the carbide tank and water reservoir, the carbide tank, engine radiator and reservoir being normally in open direct connection with the intake of the engine during the suction period of the engine.

In testimony whereof I affix my signature.

ROY J. MEYERS.